(12) United States Patent
Guo et al.

(10) Patent No.: US 11,301,662 B2
(45) Date of Patent: Apr. 12, 2022

(54) ULTRASONIC FINGERPRINT DETECTION CIRCUIT, ULTRASONIC FINGERPRINT DETECTION METHOD, AND DISPLAY APPARATUS

(71) Applicant: BOE TECHNOLOGY GROUP CO., LTD., Beijing (CN)

(72) Inventors: Yuzhen Guo, Beijing (CN); Haisheng Wang, Beijing (CN); Chunwei Wu, Beijing (CN); Yingming Liu, Beijing (CN); Lijun Zhao, Beijing (CN); Wei Liu, Beijing (CN); Changfeng Li, Beijing (CN); Rui Xu, Beijing (CN); Yanan Jia, Beijing (CN); Yunke Qin, Beijing (CN); Pinchao Gu, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 495 days.

(21) Appl. No.: 16/332,221

(22) PCT Filed: Jun. 29, 2018

(86) PCT No.: PCT/CN2018/093673
§ 371 (c)(1),
(2) Date: Mar. 11, 2019

(87) PCT Pub. No.: WO2019/136942
PCT Pub. Date: Jul. 18, 2019

(65) Prior Publication Data
US 2021/0334492 A1    Oct. 28, 2021

(30) Foreign Application Priority Data
Jan. 12, 2018    (CN) .......................... 201810031167.2

(51) Int. Cl.
*G06K 9/00* (2006.01)
*G06F 3/044* (2006.01)

(52) U.S. Cl.
CPC ......... *G06K 9/0002* (2013.01); *G06F 3/0443* (2019.05); *G06F 3/0446* (2019.05); *G06K 9/0012* (2013.01)

(58) Field of Classification Search
CPC .... G06K 9/0002; G06K 9/0012; G06K 9/228; G06F 3/0446; G06F 3/0443; G06F 3/0412; G06F 3/0445
(Continued)

(56) References Cited

U.S. PATENT DOCUMENTS

| 2015/0015803 A1* | 1/2015 | Wang | G06F 3/0445 |
| | | | 349/12 |
| 2017/0124370 A1 | 5/2017 | He et al. | |

(Continued)

FOREIGN PATENT DOCUMENTS

| CN | 101950360 A | 1/2011 |
| CN | 104042220 A | 9/2014 |

(Continued)

OTHER PUBLICATIONS

International Search Report dated Oct. 18, 2018, issued in counterpart application No. PCT/CN2018/093673. (10 pages).
(Continued)

*Primary Examiner* — Abdul-Samad A Adediran
(74) *Attorney, Agent, or Firm* — WHDA, LLP (57) ABSTRACT

The present disclosure is related to an ultrasonic fingerprint detection assembly. The ultrasonic fingerprint detection assembly may include an ultrasonic fingerprint detection circuit and a living body detection circuit. The living body
(Continued)

detection circuit may be configured to carry out living body detection at a rest stage of the ultrasonic fingerprint detection circuit.

17 Claims, 10 Drawing Sheets

(58) Field of Classification Search
USPC .......................................................... 349/12
See application file for complete search history.

(56) References Cited

U.S. PATENT DOCUMENTS

2017/0177919 A1* 6/2017 Wang ................. G01R 27/2605
2018/0101711 A1* 4/2018 D'Souza ................ G06K 9/228
2020/0293139 A1* 9/2020 Kim ...................... G06F 3/0412

FOREIGN PATENT DOCUMENTS

| CN | 105981039 A | 9/2016 |
| CN | 106897715 A | 6/2017 |
| CN | 106951130 A | 7/2017 |
| CN | 106951887 A | 7/2017 |
| WO | 2006/042144 A2 | 4/2006 |
| WO | 2017/076292 A1 | 5/2017 |

OTHER PUBLICATIONS

Office Action dated Dec. 10, 2019, issued in counterpart CN application No. 201810031167.2, with English translation. (19 pages).

* cited by examiner

Related Art

ULTRASONIC FINGERPRINT DETECTION CIRCUIT, ULTRASONIC FINGERPRINT DETECTION METHOD, AND DISPLAY APPARATUS

CROSS-REFERENCE TO RELATED APPLICATIONS

This application claims benefit of the filing date of Chinese Patent Application No. 201810031167.2 filed on Jan. 12, 2018, the disclosure of which is hereby incorporated in its entirety by reference.

TECHNICAL FIELD

This disclosure relates to a display technology, in particular, to an ultrasonic fingerprint detection circuit, an ultrasonic fingerprint detection method, and a display apparatus.

BACKGROUND

Ultrasonic fingerprint detection technology is an emerging fingerprint identification technology. In the ultrasonic fingerprint detection technology, an ultrasonic fingerprint detection circuit sends a nearly planar ultrasonic wave to a finger. The planar ultrasonic wave interacts with valleys and ridges of the fingerprint, which have different reflectivity. Accordingly, different echo signals are generated. The ultrasonic fingerprint detection circuit can receive and analyze the different echo signals to obtain fingerprint information of the finger being detected.

BRIEF SUMMARY

Accordingly, one example of the present is an ultrasonic fingerprint detection assembly. The ultrasonic fingerprint detection assembly may include an ultrasonic fingerprint detection circuit; and a living body detection circuit. The ultrasonic fingerprint detection circuit may include a plurality of ultrasonic sensors distributed in an array mode, and the plurality of the ultrasonic sensors may include first electrodes and second electrodes opposite the first electrodes respectively. The living body detection circuit may be configured to carry out living body detection at a rest stage of the ultrasonic fingerprint detection circuit.

The ultrasonic fingerprint detection circuit may further include a plurality of first wirings and a plurality of second wirings. The plurality of the first wirings may be coupled to the first electrodes respectively and extends in parallel in a first direction. The plurality of the second wirings may be coupled to the second electrodes respectively and extends in parallel in a second direction. The first direction intersects the second direction.

The living body detection circuit may include a plurality of first touch electrodes extending in parallel in a third direction and a plurality of second touch electrodes extending in parallel in a fourth direction. The third direction intersects the fourth direction. The first direction and the third direction may be the same, and the second direction and the fourth direction may be the same. A plurality of rhombic structures may be disposed at non-overlapping parts of the first touch electrodes and the second touch electrodes. Each of the plurality of the rhombic structures may have a side in a range of approximately 1 mm to approximately 5 mm. A number of the plurality of the first wirings may form the first touch electrodes. A capacitor structure may be formed between the number of the plurality of the first wirings as the first touch electrodes and the second touch electrodes.

The living body detection circuit may include a plurality of touch electrodes and a plurality of touch wirings. The plurality of touch electrodes may be coupled to the plurality of touch wirings respectively. The plurality of first wirings may be divided into a plurality of regions through a timing sequence, and a number of the first wirings in each of the plurality of regions form one of the touch electrodes. A number of the first wirings may form the touch wirings.

The ultrasonic fingerprint detection circuit may be a cMUT array.

Another embodiment of the present disclosure is an ultrasonic fingerprint detection method using the ultrasonic fingerprint detection assembly according to an embodiment of the present disclosure. The ultrasonic fingerprint detection method may include a fingerprint detection stage and a living body detection stage. The living body detection stage may be at a rest stage of the fingerprint detection stage. The ultrasonic fingerprint detection assembly may be configured to determine whether a subject being detected is a living body by detecting a change of capacitance during the living body detection stage.

In one embodiment, the ultrasonic fingerprint detection assembly may be configured to determine whether a subject being detected is a living body by detecting a change of capacitance between the first touch electrodes and the second touch electrodes of the living body detection circuit during the living body detection stage.

In one embodiment, the ultrasonic fingerprint detecting assembly may be configured to determine whether a subject being detected is a living body by detecting a change of capacitance between the touch electrodes of the living body detection circuit and the ground during the living body detection stage.

The electrode wirings at non-overlapping part of the ultrasonic fingerprint detection circuit and the living body detection circuit may be provided with signals which are synchronous with detection signal of the living body detection circuit during the living body detection stage.

Another embodiment of the present disclosure is a display apparatus. The display apparatus may include the ultrasonic fingerprint detection assembly according to one embodiment of the present disclosure.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the disclosure are apparent from the following detailed description taken in conjunction with the accompanying drawings in which:

DETAILED DESCRIPTION

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-10. When referring to the figures, like structures and elements shown throughout are indicated with like reference numerals.

In addition, the described features, structures or characteristics in one or more embodiments can be combined in any suitable manner. In the following description, numerous specific details are provided to give a thorough understanding of embodiments of the disclosure. However, those skilled in the art will recognize that the technical solutions of the present disclosure may be practiced without one or more of the specific details, or may adopt other methods, circuits, materials, apparatus, steps and the like. In other cases, well-known structures, methods, apparatus, implementation, material or operation are not shown or described in detail to avoid obscuring aspects of the present disclosure.

The block diagram shown in the figures is merely a functional entity, and does not necessarily correspond to physical and independent entities. That is, the functional entities can be implemented in a form of software, or a part of the functional entities or the functional entities is implemented in one or more software-hardened modules. Alternatively, the function entities can be implemented in different networks and/or processor apparatuses and/or microcontroller apparatuses.

Fingerprint information is easy to be imitated. Thus, whether the ultrasonic fingerprint detection circuit can detect a living body at the same time that the fingerprint information is detected has received a lot of attention recently.

In related technologies, the ultrasonic fingerprint detection circuit can determine whether the subject being detected is a living body by recognizing stratification of human epidermis and dermis. However, the thickness of the human epidermis is only less than 0.3 mm. As such, an ultrasonic fingerprint detection circuit needs to have high vertical resolution.

Figure 1:
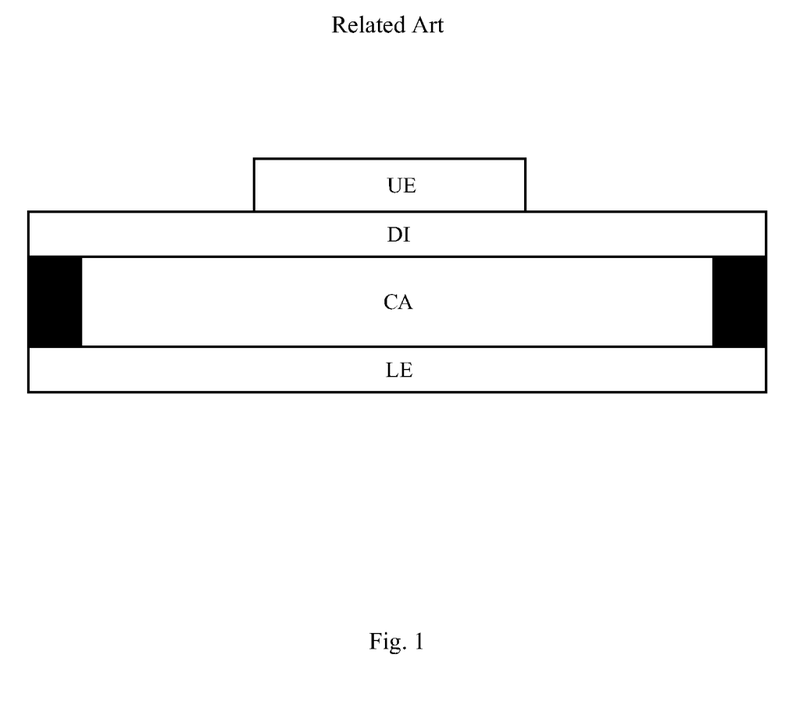
FIG. 1 is a schematic diagram of a capacitive micromachined ultrasonic transducer in the prior art.

A structural diagram of a capacitive Micromachined Ultrasonic Transducer (cMUT) in related technologies is provided, as shown in FIG. 1. The cMUT includes an upper electrode UE, a lower electrode LE, and a vibrating diaphragm DI. Meanwhile, the operating principle of the cMUT determines that the cMUT has a cavity structure CA. The cavity structure CA requires the vibrating diaphragm DI to have a large quality factor, thereby not facilitating generating pulses with enough vertical resolution. Therefore, although the cMUT has good matching characteristics with a glass-based process and can be conveniently incorporated into a production line of a display screen with a glass substrate, it does not have enough vertical resolution, and accordingly, it cannot be applied to a display apparatus requiring living body detection.

Figure 2:
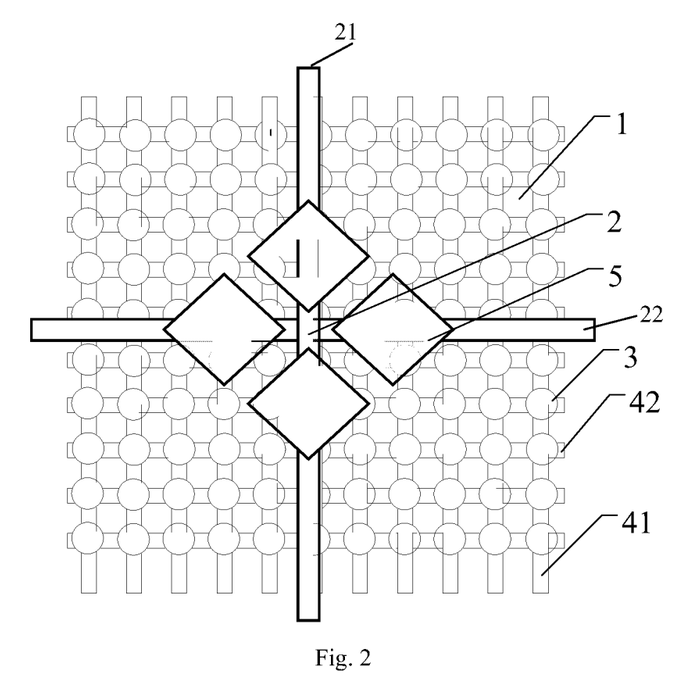
FIG. 2 is a schematic diagram of an ultrasonic fingerprint detection assembly according to some embodiments the present disclosure.

An ultrasonic fingerprint detection assembly is provided according to some embodiments of the present disclosure. As shown in FIG. 2, the ultrasonic fingerprint detection assembly includes an ultrasonic fingerprint detection circuit 1 and a living body detection circuit 2. The ultrasonic fingerprint detection circuit 1 is configured to carry out fingerprint detection. The living body detection circuit 2 overlaps the ultrasonic fingerprint detection circuit 1, and is configured to carry out living body detection at a rest stage of the ultrasonic fingerprint detection circuit 1.

An ultrasonic fingerprint detection assembly is provided according to some embodiments of the present disclosure. The ultrasonic fingerprint detection assembly includes an ultrasonic fingerprint detection circuit and a living body detection circuit. The living body detection circuit performs living body detection when the ultrasonic fingerprint detection circuit is at a rest stage. On one hand, the ultrasonic fingerprint detection assembly can perform living body detection while carrying out fingerprint detection on the subject being detected. On the other hand, the ultrasonic fingerprint detection assembly can be configured to detect living body using various types of ultrasonic fingerprint detection circuits.

In some embodiments, as shown in FIG. 2, the ultrasonic fingerprint detection circuit 1 includes a plurality of ultrasonic sensors 3 distributed in an array mode. Each of the plurality of ultrasonic sensors 3 includes a first electrode and a second electrode which are opposite to each other. The ultrasonic fingerprint detection circuit 1 further includes a plurality of first wirings 41 and a plurality of second wirings 42. The plurality of first wirings 41 is coupled to the corresponding first electrodes respectively. The plurality of first wirings 41 extends in parallel in a first direction. The plurality of second wirings 42 is coupled to the corresponding second electrodes respectively. The plurality of second wirings 42 extends in parallel in a second direction. The first direction intersects the second direction.

Figure 3:
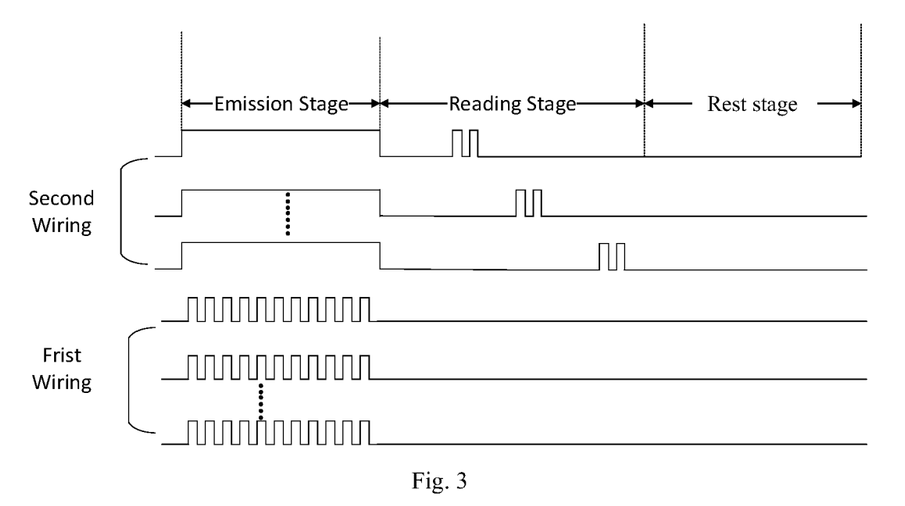
FIG. 3 is a timing diagram of an ultrasonic fingerprint detection circuit of an ultrasonic fingerprint assembly according to some embodiments the present disclosure.

The fingerprint detection process on a subject being detected by an ultrasonic fingerprint detection circuit 1 includes the following stages: an ultrasonic emission stage, an echo signal reading stage, and a rest stage. FIG. 3 is a timing diagram of an ultrasonic fingerprint detection circuit of an ultrasonic fingerprint detection assembly according to some embodiments the present disclosure. During the ultrasonic emission stage, the second wirings 42 provide a signal of constant potential to the second electrodes of the ultrasonic sensors 3 respectively. The first wirings 41 provide a pulse signal to the first electrodes of the ultrasonic sensors 3 respectively. As such, each of the ultrasonic sensors 3 is excited to emit an ultrasonic wave. The ultrasonic wave emitted by the ultrasonic fingerprint detection circuit 1 interacts with ridges and valleys of a fingerprint. Since the valleys and the ridges have different reflectivity, different echo signals are formed. During the echo signal reading stage, the first wirings 41 stop providing the pulse signals to the first electrodes of the ultrasonic sensors 3. The second wirings 42 provide pulse signals to the second electrodes of the ultrasonic sensors 3 line by line to turn on the ultrasonic sensors 3 line by line. As such, the ultrasonic sensors 3 receive echo signals line by line. During the rest stage, the ultrasonic sensors 3 do not work and are configured to wait for complete attenuation of the echo signals.

In some embodiments, as shown in FIG. 2, the living body detection circuit 2 is a mutual capacitance touch circuit. In one embodiment, the living body detection circuit 2 includes a plurality of first touch electrodes 21 and a plurality of second touch electrodes 22. The plurality of first touch electrodes 21 extend in parallel in a third direction. The plurality of second touch electrodes 22 extend in parallel in a fourth direction. The third direction intersects the fourth direction.

In some embodiments, the living body detection circuit 2 is formed by disposing an insulation layer (not shown in Figs.), the second touch electrodes 22, and the first touch electrodes 21 sequentially above the ultrasonic fingerprint detection circuit 1. A dielectric layer is arranged between the first touch electrodes 21 and the second touch electrodes 22. The first touch electrodes 21 and the second touch electrodes 22 form a capacitor structure.

Figure 4:
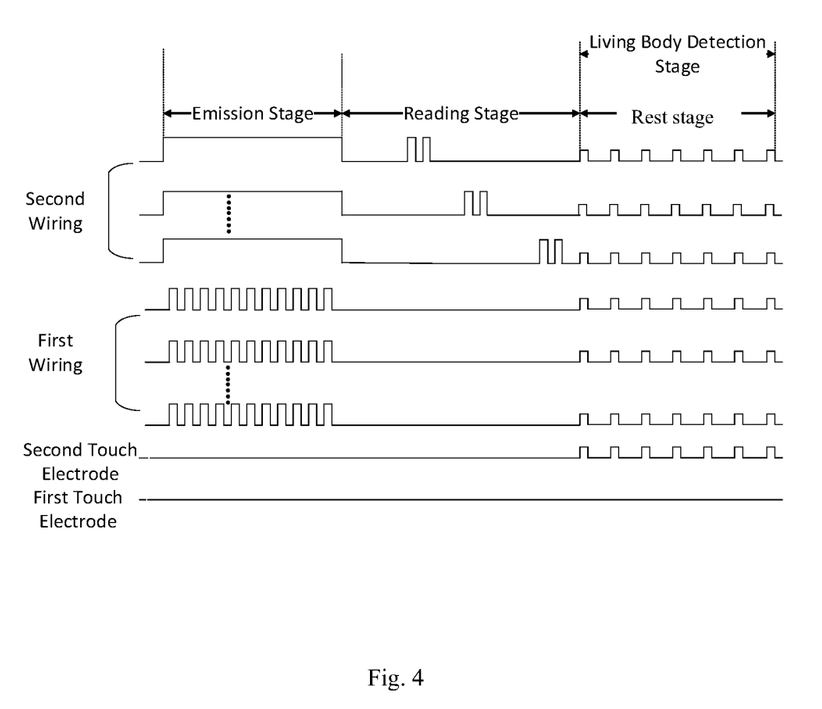
FIG. 4 is a timing diagram of an ultrasonic fingerprint detection assembly according to some embodiments the present disclosure.

FIG. 4 is a timing diagram of an ultrasonic fingerprint detection assembly according to some embodiments of the present disclosure. As shown in FIG. 4, the rest stage of the ultrasonic sensor 3 can be used by the living body detection circuit 2 for living body detection. During this stage, the ultrasonic sensors 3 do not work. The second touch electrodes 22 are inputted with pulse signals. The first touch electrodes 21 generate inductive charges under an action of the pulse signals. If the subject being tested is a living body, which is electrically conductive, the subject being tested and the second touch electrode 22 form a new capacitor structure. As such, the capacitance between the first touch electrode 21 and the second touch electrode 22 is reduced. The charges on the first touch electrode 21 flow to the subject being tested. In addition, since a living body has a specific conductivity, it can influence the capacitance between the first touch electrode 21 and the second touch electrode 22 to vary within a specific range such as 0.1-2 pF Therefore, when the capacitance detected between the first touch electrode 21 and the second touch electrode 21 varies within the specific range, the subject being detected is determined to be a living body. For the living body detection circuit 2 in the present embodiments, the first direction and the third direction can be the same or different, and the second direction and the fourth direction can be the same or different.

In some embodiments, as shown in FIG. 2, the non-overlapping part of the first touch electrode 21 and the second touch electrode 22 has rhombic structures 5. The rhombic structures 5 can increase the capacitance between the first touch electrode 21 and the second touch electrode 22, thereby improving precision of living body detection.

In some embodiments, the living body detection circuit 2 is a self-capacitance living body detection circuit 2. The self-capacitance living body detection circuit 2 can use a portion of wirings of the ultrasonic fingerprint detection circuit 1 as a common electrode, thereby simplifying the structure of the ultrasonic fingerprint detection assembly and saving the cost.

Figure 5:
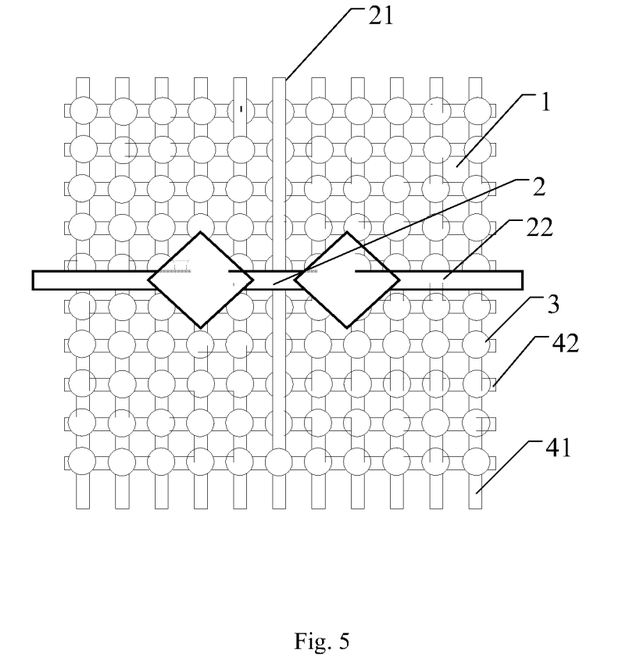
FIG. 5 is a schematic diagram of an ultrasonic fingerprint detection assembly according to some embodiments the present disclosure.

FIG. 5 is a schematic diagram of an ultrasonic fingerprint detection assembly according to some embodiments the present disclosure. As shown in FIG. 5, for the living body detection circuit 2, the first direction and the third direction are the same; and the second direction and the fourth direction are the same. A number of the first wirings 41 forms the first touch electrodes 21. The structure of the living body detection circuit 2 can include a dielectric layer (not shown) and the second touch electrodes 22 sequentially arranged above the ultrasonic fingerprint detection circuit 1. Capacitor structures are formed between the number of the first wirings 41 as the first touch electrodes and the second touch electrodes 22.

Figure 6:
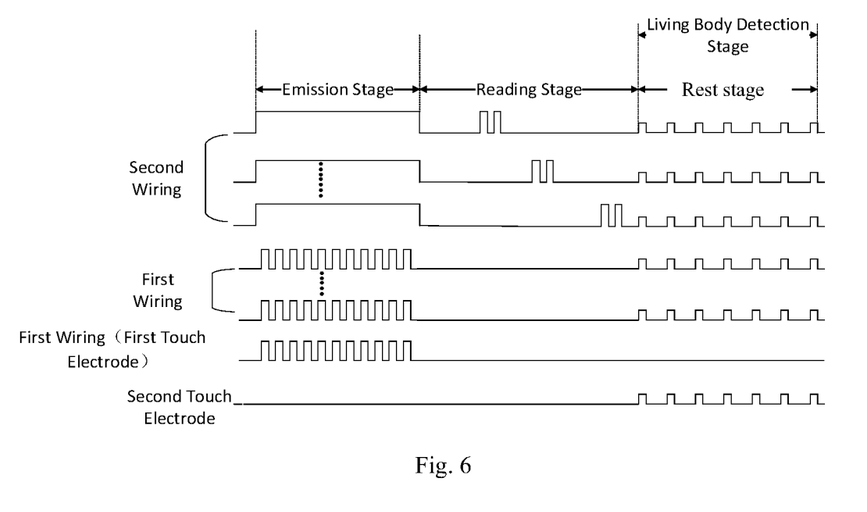
FIG. 6 is a timing diagram of an ultrasonic fingerprint detection assembly according to some embodiments the present disclosure.

FIG. 6 is a timing diagram of an ultrasonic fingerprint detection assembly according to some embodiments the present disclosure. As shown in FIG. 6, the rest stage of the ultrasonic sensor 3 can be used by the living body detection circuit 2 for living body detection. During this stage, the ultrasonic sensors 3 do not work, and the second touch electrodes 22 are inputted with pulse signals. The number of the first wirings 41 as the first touch electrodes generate inductive charges under an action of the pulse signals. If the subject being tested is a living body, which is electrically conductive, a new capacitor structure is formed between the subject being detected and the second touch electrodes 22. As such, the capacitance between the number of the first wirings 41 as the first touch electrodes and the second touch electrodes 22 is reduced. The charges on the part of the first wirings as the first touch electrodes 41 flow to the subject being detected. In addition, since a living body has a specific conductivity, the living body can influence the capacitance between the first touch electrodes 21 and the second touch electrodes 22 to vary within a specific range such as 0.1-2 pF. Therefore, when a change of capacitance between the number of the first wirings 41 as the first touch electrodes and the touch electrodes 22 is detected within a specific range, the subject being detected is determined as a living body. In this embodiment, the structure of the ultrasonic fingerprint detection assembly is simplified, thereby saving the cost.

Figure 7:
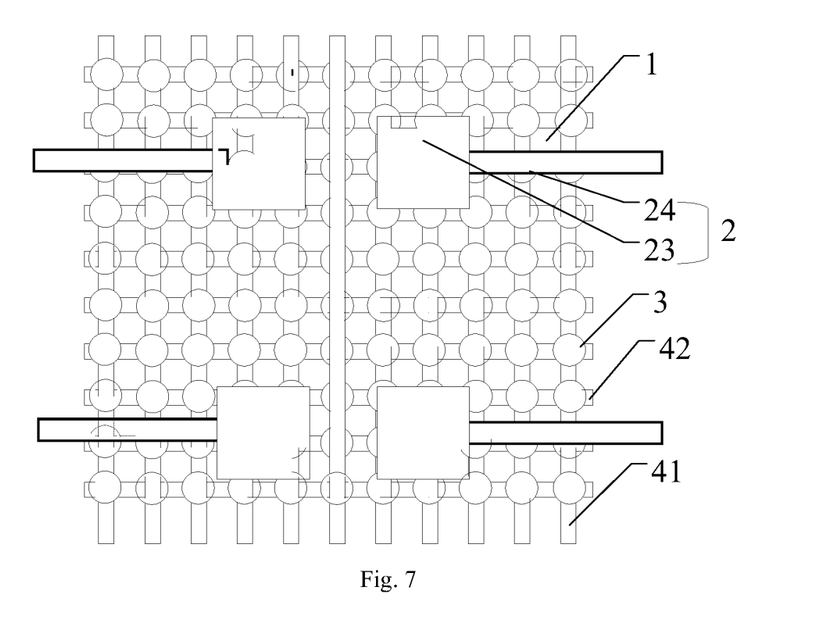
FIG. 7 is a schematic diagram of an ultrasonic fingerprint detection assembly according to some embodiments the present disclosure.

In some embodiments, the living body detection circuit 2 is a self-capacitance touch circuit. FIG. 7 is a schematic diagram of an ultrasonic fingerprint detection assembly according to some embodiments the present disclosure. As shown in FIG. 7, the living body detection circuit 2 includes a plurality of touch electrodes 23 and a plurality of touch wirings 24. The plurality of touch electrodes 23 is coupled to the touch wiring 24 respectively. The living body detection circuit 2 can include an insulation layer (not shown) arranged above the ultrasonic fingerprint detection circuit 1, a plurality of touch electrodes 23 and a plurality of touch wirings 24 arranged on the insulating layer. The touch electrodes 23 and the ground form a capacitor structure.

Figure 8:
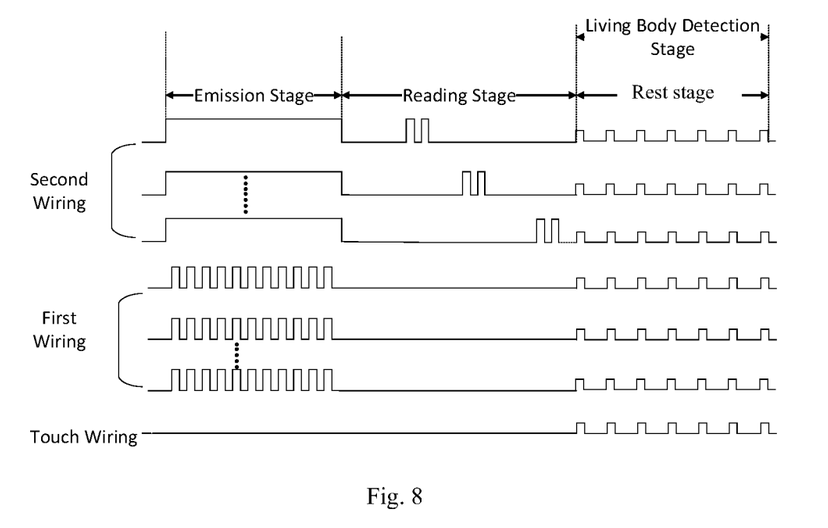
FIG. 8 is a timing diagram of an ultrasonic fingerprint detection assembly according to some embodiments the present disclosure.

FIG. 8 is a timing diagram of an ultrasonic fingerprint detection assembly according to some embodiments the present disclosure. As shown in FIG. 8, the rest stage of the ultrasonic sensor 3 is used by the living body detection circuit 2 for living body detection. During this stage, the ultrasonic sensors 3 do not work, and the touch wirings 24 are inputted with pulse signals. The touch electrodes 23 generate induced charges under an action of the pulse signals. If the subject being detected is a living body, which is electrically conductive, a new capacitor structure is formed between the subject being detected and the touch electrodes 23. As such, the capacitance between the touch electrodes 23 and the ground is increased, and the amount of electric charges on the touch electrodes 23 is increased. Furthermore, since a living body has a specific conductivity, it can influence the capacitance between the touch electrodes 23 and the ground to vary within a specific range such as 0.1-2 pF. Therefore, when the capacitance between the touch electrode 23 and the ground is detected to vary within the specific range, the subject being detected is determined as a living body.

Figure 9:
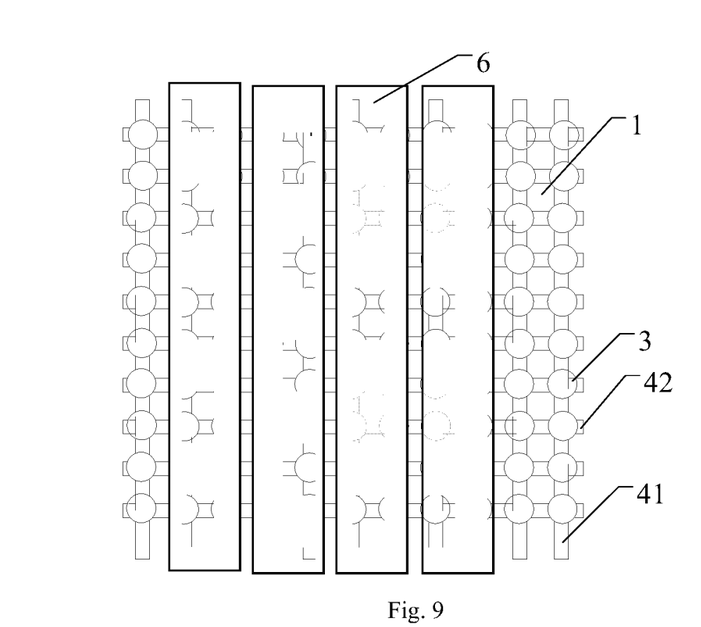
FIG. 9 is a schematic diagram of an ultrasonic fingerprint detection assembly according to some embodiments the present disclosure.

In the embodiments of the present disclosure, the self-capacitance living body detection circuit 2 can also use a number of wirings of the ultrasonic fingerprint detection circuit 1 as a common electrode. As such, the structure of the ultrasonic fingerprint detection assembly is simplified, thereby saving the cost. FIG. 9 is a schematic diagram of an ultrasonic fingerprint detection assembly according to some embodiments the present disclosure. As shown in FIG. 9, the living body detection circuit 2 can include the following structure: through a preset timing sequence, the first wirings 41 are divided into a plurality of preset regions 6. The first wirings at each of the plurality of preset regions 6 form a touch electrode 23. A number of the first wirings 41 form the touch wirings 24 (not shown?).

Figure 10:
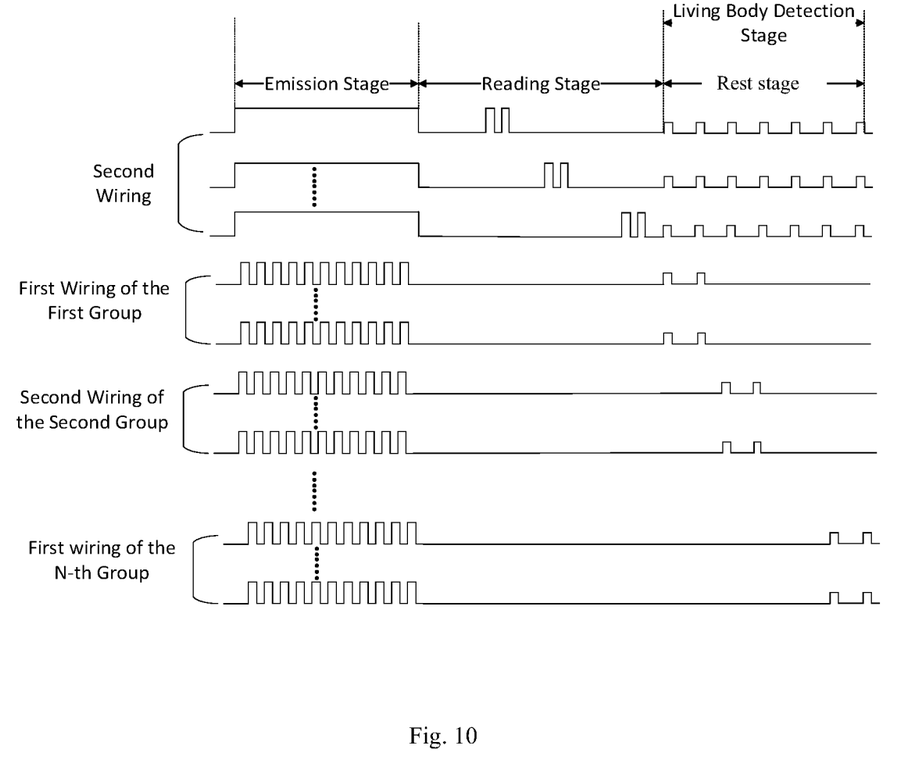
FIG. 10 is a timing diagram of an ultrasonic fingerprint detection assembly according to some embodiments the present disclosure.

FIG. 10 is a timing diagram of an ultrasonic fingerprint detection assembly according to some embodiments the present disclosure. As shown in FIG. 10, the rest stage of the ultrasonic sensors 3 is used by the living body detection circuit 2 for living body detection. During this stage, the ultrasonic sensors 3 do not work. The plurality of first wirings 41 can be divided into n groups of first wirings. Each group of the first wirings is configured to send pulse signals according to a preset time sequence. There is a time difference between the timing of sending the pulse signals by each group of the first wirings. Therefore, the regions where each group of the first wirings is located can be set to be the preset regions 6. Whether the subject being detected is a living body or not can be determined by detecting changes of the capacitance between the preset regions 6 and the ground. It should be understood that the living body detection circuit 2 has other modes of arrangement or structure, which also belongs to the protection scope of the disclosure.

In the embodiments, as shown in FIGS. 4, 6, 8 and 10, during the rest stage of the ultrasonic fingerprint detection circuit 1, the electrode wirings at the non-overlapping part of the ultrasonic fingerprint detection circuit 1 and the living body detection circuit 2 can have signals which are synchronous with the detection signal of the living body detection circuit. As such, the living body detection circuit 2 and the electrode wirings at the non-overlapping part of the ultrasonic fingerprint detection circuit 1 and the living body detection circuit 2 are prevented from forming parasitic capacitance and, accordingly, the detection of living body is not affected. In the embodiments, during the stage of living body detection, the frequency of the pulse signals inputted is about 100 kHz and the intensity of the pulse signals is approximately 1 V-10 V. During the ultrasonic emission stage, the frequency of the pulses is about 8 MHz-20 MHz, and the intensity of the pulses is about 50 V-200 V. Therefore, as shown in FIGS. 6 and 10, during the living body detection stage, although there is a potential difference between the pulses of the number of the first wiring and the pulses of the second wirings, the frequency of the pulses is 100 kHz, and the potential difference is less than 10V. Both the frequency and the potential difference are smaller than the driving frequency and the driving potential required for emitting ultrasonic waves respectively. As such, no ultrasonic pulse is generated during the living body detection stage. The ultrasonic wave is silent at this stage.

In some embodiments, the ultrasonic fingerprint detection circuit is a cMUT array. The cMUT has good matching characteristics with the process of glass substrate, thereby having better compatibility with a display screen with a glass substrate. In some embodiments, the ultrasonic fingerprint detection circuit can also be an array of voltage type ultrasonic sensors, all of which belong to the protection scope of the present disclosure.

A method of ultrasonic fingerprint detection is provided according to some embodiments of the present disclosure. The method includes a fingerprint detection stage and a living body detection stage. The living body detection stage is within a rest stage of the fingerprint detection stage.

In some embodiments, during the living body detection stage, whether the subject being detected is a living body or not is determined by detecting a change of capacitance.

In some embodiments, during the living body detection stage, whether the subject being detected is a living body or not is determined by detecting a change of the capacitance between the first touch electrodes and the second touch electrodes.

In some embodiments, during the living body detection stage, whether the subject being detected is a living body or not is determined by detecting a change of the capacitance between the touch electrodes and the ground.

In some embodiments, during the living body detection stage, at least a number of the electrode wirings of the ultrasonic sensors forms the touch electrodes. The electrode wirings at the non-overlapping part are provided with signals which are synchronous with the detection signal of the living body detection circuit.

The ultrasonic fingerprint detection method and that of the ultrasonic fingerprint detection assembly as mentioned above have the same technical characteristics and operating principles, which have been described in detail and not repeated herein.

A display apparatus is provided according to some embodiments of the present disclosure. The display apparatus includes an ultrasonic fingerprint detection assembly according to one embodiment of the present disclosure.

The display apparatus and the ultrasonic fingerprint detection assembly mentioned above have the same technical characteristics and operating principles, which have been described in detail and not repeated herein.

The principle and the embodiment of the disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:
1. An ultrasonic fingerprint detection assembly, comprising:
   an ultrasonic fingerprint detection circuit; and
   a living body detection circuit,
   wherein the ultrasonic fingerprint detection circuit comprises a plurality of ultrasonic sensors distributed in an array mode, and the plurality of the ultrasonic sensors comprises first electrodes and second electrodes opposite the first electrodes respectively, and
   the living body detection circuit is configured to carry out living body detection at a rest stage of the ultrasonic fingerprint detection circuit;
   the ultrasonic fingerprint detection circuit includes a plurality of first wirings and the living body detection circuit includes a plurality of first touch electrodes;

a number of the plurality of first wirings forms the plurality of first touch electrodes.

2. The ultrasonic fingerprint detection assembly according to claim 1, wherein the ultrasonic fingerprint detection circuit further comprises a plurality of second wirings; the plurality of first wirings is coupled to the first electrodes respectively and extends in parallel in a first direction; the plurality of second wirings is coupled to the second electrodes respectively and extends in parallel in a second direction; and the first direction intersects the second direction.

3. The ultrasonic fingerprint detection assembly according to claim 1, wherein the living body detection circuit comprises:
a plurality of second touch electrodes extending in parallel in a fourth direction;
wherein the plurality of first touch electrodes extend in parallel in a third direction and the third direction intersects the fourth direction.

4. The ultrasonic fingerprint detection assembly according to claim 2, wherein the living body detection circuit further includes a plurality of second touch electrodes extending in parallel in a fourth direction;
the plurality of first touch electrodes extend in parallel in a third direction and the third direction intersects the fourth direction and; and
the first direction is parallel to the third direction, and the second direction is parallel to the fourth direction.

5. The ultrasonic fingerprint detection assembly according to claim 4, wherein a plurality of rhombic structures is disposed at non-overlapping parts of the plurality of first touch electrodes and the plurality of second touch electrodes.

6. The ultrasonic fingerprint detection assembly according to claim 5, wherein each of the plurality of rhombic structures has a side in a range of approximately 1 mm to approximately 5 mm.

7. The ultrasonic fingerprint detection assembly according to claim 3, wherein a capacitor structure is formed between the number of the plurality of first wirings and the plurality of second touch electrodes.

8. The ultrasonic fingerprint detection assembly according to claim 2, wherein the living body detection circuit comprises:
a plurality of touch electrodes; and
a plurality of touch wirings,
wherein the plurality of touch electrodes is coupled to the plurality of touch wirings respectively.

9. The ultrasonic fingerprint detection assembly according to claim 8, wherein the plurality of first wirings are divided into a plurality of regions through a timing sequence, the plurality of first wirings includes a plurality of third wirings in each of the plurality of regions, and the plurality of third wirings form one of the touch electrodes.

10. The ultrasonic fingerprint detection assembly according to claim 8, wherein a number of the plurality of first wirings forms the touch wirings.

11. The ultrasonic fingerprint detection assembly according to claim 1, wherein the ultrasonic fingerprint detection circuit is a cMUT array.

12. A display apparatus comprising the ultrasonic fingerprint detection assembly according to claim 1.

13. An ultrasonic fingerprint detection method of operating an ultrasonic fingerprint detection assembly, comprising:
performing a fingerprint detection at a fingerprint detection stage; and
performing a living body detection at a living body detection stage,
wherein the living body detection stage is at a rest stage of the fingerprint detection stage;
the ultrasonic fingerprint detection assembly includes an ultrasonic fingerprint detection circuit, and a living body detection circuit, wherein
the ultrasonic fingerprint detection circuit comprises a plurality of ultrasonic sensors distributed in an array mode and the plurality of the ultrasonic sensors comprises first electrodes and second electrodes opposite the first electrodes respectively;
the ultrasonic fingerprint detection circuit includes a plurality of first s and the living body detection circuit includes a plurality of first touch electrodes;
a number of the plurality of first wirings forms the plurality of first touch electrodes.

14. The ultrasonic fingerprint detection method according to claim 13, wherein the ultrasonic fingerprint detection assembly is configured to determine whether a subject being detected is a living body by detecting a change of capacitance during the living body detection stage.

15. The ultrasonic fingerprint detection method according to claim 13,
wherein the living body detection circuit further includes a plurality of second ouch electrodes; and
the ultrasonic fingerprint detection assembly is configured to determine whether a subject being detected is a living body by detecting a change of capacitance between the plurality of first touch electrodes and the plurality of second touch electrodes of the living body detection circuit during the living body detection stage.

16. An ultrasonic fingerprint detection method of operating an ultrasonic fingerprint detection assembly, comprising:
performing a fingerprint detection at a fingerprint detection stage; and
performing a living body detection at a living body detection stage,
wherein the living body detection stage is at a rest stage of the fingerprint detection stage;
the ultrasonic fingerprint detection assembly includes an ultrasonic fingerprint detection circuit and a living body detection circuit;
the ultrasonic fingerprint detection circuit comprises a plurality of ultrasonic sensors distributed in an array mode and the plurality of the ultrasonic sensors comprises first electrodes and second electrodes opposite the first electrodes respectively;
the ultrasonic fingerprint detection circuit includes a plurality of first s and the living body detection circuit includes a plurality of first touch electrodes;
a number of the plurality of first wirings forms the plurality of first touch electrodes;
the living body detection circuit further includes a plurality of touch electrodes and a plurality of touch wirings, and the plurality of touch electrodes is coupled to the plurality of touch wirings respectively;
the plurality of first wirings are divided into a plurality of regions through a timing sequence, the plurality of first wirings includes a plurality of third wirings in each of the plurality of regions, and the plurality of third wirings form one of the touch electrodes; and
the ultrasonic fingerprint detecting assembly is configured to determine whether a subject being detected is a living body by detecting a change of capacitance between the touch electrodes of the living body detection circuit and the ground during the living body detection stage.

17. The ultrasonic fingerprint detection method according to claim 13, wherein the electrode wirings at non-overlapping part of the ultrasonic fingerprint detection circuit and the living body detection circuit are provided with signals which are synchronous with detection signal of the living body detection circuit during the living body detection stage.

* * * * *